United States Patent
Kompella et al.

(10) Patent No.: US 8,937,945 B2
(45) Date of Patent: Jan. 20, 2015

(54) METHOD AND APPARATUS FOR OPTIMIZING USAGE OF TERNARY CONTENT ADDRESSABLE MEMORY (TCAM)

(75) Inventors: Vachaspathi Peter Kompella, Cupertino, CA (US); Satyam Sinha, Sunnyvale, CA (US); Praveen Muley, Mountain View, CA (US); Amit Goyal, Sunnyvale, CA (US); Sundara Murugan, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 145 days.

(21) Appl. No.: 13/611,915

(22) Filed: Sep. 12, 2012

(65) Prior Publication Data

US 2014/0071985 A1 Mar. 13, 2014

(51) Int. Cl.
*H04L 12/56* (2006.01)
(52) U.S. Cl.
USPC .......................................... 370/389; 709/203
(58) Field of Classification Search
None
See application file for complete search history.

(56) References Cited

U.S. PATENT DOCUMENTS

| | | | |
|---|---|---|---|
| 6,978,273 B1* | 12/2005 | Bonneau et al. ..................... 1/1 |
| 7,933,205 B1* | 4/2011 | Shaw et al. .................. 370/235 |
| 2002/0075805 A1* | 6/2002 | Gupta et al. .................. 370/235 |
| 2003/0027554 A1* | 2/2003 | Haumont ...................... 455/414 |
| 2008/0291923 A1* | 11/2008 | Back et al. .................... 370/396 |
| 2011/0075559 A1* | 3/2011 | Katsura et al. ............... 370/231 |
| 2011/0087786 A1* | 4/2011 | Chandrachood et al. ..... 709/226 |
| 2011/0131338 A1* | 6/2011 | Hu ................................ 709/229 |
| 2013/0272305 A1* | 10/2013 | Lefebvre et al. .............. 370/392 |

* cited by examiner

*Primary Examiner* — Anh-Vu Ly
*Assistant Examiner* — Hashim Bhatti
(74) *Attorney, Agent, or Firm* — Wall & Tong LLP (57) ABSTRACT

Various embodiments provide a method and apparatus for processing incoming packets in an efficient manner. A service ID bitmap indicating available services associated with the user is established. The available services are grouped into service set. Common service set having common set of rules is determined. A user associated with common service set and incoming traffic is identified. The incoming traffic is processed according to the common set of rules indicated by the service ID bitmap. The efficient use of Ternary Content Addressable Memory (TCAM) results in faster search result, lower power consumption and chip footprint among others.

14 Claims, 6 Drawing Sheets

| Bssid | Svcid-bitmap | Remote-Addr | Local-addr | Remote-port | Local-port | Protocol |
|---|---|---|---|---|---|---|

FIG. 3A

| 16BITS | 16BITS | 32BITS | 32BITS | 32BITS | 16BITS | 16BITS | 8BITS |
|---|---|---|---|---|---|---|---|
| TCAM ENTRY # | BSS-ID | Svc-ID Map | Rmt-Addr | Lcl-Addr | Rmt-port | Lcl-port | Protocol |
| 1 | 1 | 0X01 | S1-Rmt-Addr | S1-lcl-Addr | S1-Rmt-port | S1-lcl-port | S1-proto |
| 2 | 1 | 0X02 | S2-Rmt-Addr | S2-lcl-Addr | S2-Rmt-port | S2-lcl-port | S2-proto |
| 3 | 1 | 0X04 | S3-Rmt-Addr | S3-lcl-Addr | S3-Rmt-port | S3-lcl-port | S3-proto |
| 4 | 1 | 0X08 | S4-Rmt-Addr | S4-lcl-Addr | S4-Rmt-port | S4-lcl-port | S4-proto |
| 5 | 1 | 0X10 | S5-Rmt-Addr | S5-lcl-Addr | S5-Rmt-port | S5-lcl-port | S5-proto |
| 6 | 1 | 0X20 | S6-Rmt-Addr | S6-lcl-Addr | S6-Rmt-port | S6-lcl-port | S6-proto |
| 7 | 1 | 0X40 | S7-Rmt-Addr | S7-lcl-Addr | S7-Rmt-port | S7-lcl-port | S7-proto |
| 8 | 1 | 0X80 | S8-Rmt-Addr | S8-lcl-Addr | S8-Rmt-port | S8-lcl-port | S8-proto |

FIG. 3B

| 405 | 410 | 415 |
|---|---|---|
| USER ID | SUBSCRIBED SERVICES | RESULTING SERVICE MAP |
| 1 | S1 S2 S3 | 0x01 \| 0x02 \| 0x04 == 0x07 |
| 2 | S2 S3 S4 | 0x02 \| 0x04 \| 0x08 == 0x0e |
| 3 | S3 S4 S5 | 0x08 \| 0x10 \| 0x20 == 0x38 |
| 4 | S5 S6 S7 | 0x20 \| 0x40 \| 0x80 == 0xe0 |
| 5 | S1 S3 S5 | 0x01 \| 0x04 \| 0x08 == 0x0d |
| 6 | S1 S4 S5 | 0x01 \| 0x10 \| 0x20 == 0x31 |
| 7 | S1 S5 S6 | 0x01 \| 0x20 \| 0x40 == 0x61 |
| 8 | S1 S5 S7 | 0x01 \| 0x20 \| 0x80 ==0xa1 |

FIG. 4A

| 420 | 425 | 430 |
|---|---|---|
| User Id | Bss Id | Svc Map |
| 1 | 1 | 0x07 |
| 2 | 1 | 0x0e |
| 3 | 1 | 0x38 |
| 4 | 1 | 0xe0 |
| 5 | 1 | 0x0d |
| 6 | 1 | 0x31 |
| 7 | 1 | 0x61 |
| 8 | 1 | 0xa1 |

FIG. 4B

| 435 | 440 | 445 | 450 | 455 | 460 | 465 |
|---|---|---|---|---|---|---|
| Bss-Id | Svc-Id Map | Rmt-Addr | Lcl-Addr | Rmt-port | Lcl-port | Protocol |
| 1 | 0x07 | S1-Rmt-Addr | S1-Lcl-Addr | S1-Rmt-port | S1-Lcl-port | S1-proto |

FIG. 4C

| 470 | 475 | 480 | 485 | 490 | 495 | 496 |
|---|---|---|---|---|---|---|
| Bss-Id | Svc-Id Map | Rmt-Addr | Lcl-Addr | Rmt-port | Lcl-port | Proco |
| 1 | 0x07 | S4-Rmt-Addr | S4-Lcl-Addr | S4-Rmt-port | S4-Lcl-port | S4-proto |

METHOD AND APPARATUS FOR OPTIMIZING USAGE OF TERNARY CONTENT ADDRESSABLE MEMORY (TCAM)

TECHNICAL FIELD

The invention relates generally to network communications and more particularly to methods and apparatus for optimizing usage of ternary content addressable memory.

BACKGROUND

A user/consumer may subscribe to different services like Data, VoIP, Video, P2P, etc. Each of these services may be charged differently, may receive different quality of service (QoS) treatment in the network and so on. A consumer/user's subscription or service level agreement (SLA) determines the treatment accorded to the consumer/user's traffic. For example, if a mobile user signs up for Data and Video service, then within a routing device the mobile user's traffic may forwarded to a ternary content addressable memory (TCAM) for traffic classification and/or to optimize or guarantee performance, improve latency, and/or increase usable bandwidth for some kinds of packets by delaying other kinds of packets that meet certain criteria for charging and QoS purposes.

Every time a subscriber signs up for a service, a set of related service rules is instantiated into a TCAM so that the service traffic can be segregated for charging and QoS purposes.

SUMMARY

Various embodiments provide a method and apparatus for improving ternary content addressable memory (TCAM) search applications associated with multiple entities. The efficient use of TCAM results in faster search result, lower power consumption and chip footprint among others.

In one embodiment, a method is provided for establishing for each of a plurality of users a respective service ID bitmap. The service ID bitmap is adapted to indicate one or more available services associated with a user wherein each service is associated with a corresponding set of rules instantiated into memory, each rule being associated with a respective service ID; grouping a plurality of services into common service set having associated with it a common set of rules; determining each user associated with the common service; and processing each received packet from the user associated with the common service set according to those common service set rules indicated by the user service ID bitmap.

Another embodiment provides an apparatus for processing incoming packets. The apparatus comprises a memory and a processor configured to establish for each of a plurality of users a respective service ID bitmap. The service ID bitmap is adapted to indicate one or more available services associated with a user wherein each service is associated with a corresponding set of rules instantiated into memory, each rule being associated with a respective service ID; group a plurality of services into common service set having associated with it a common set of rules; determine each user associated with the common service; and process each received packet from the user associated with the common service set according to those common service set rules indicated by the user service ID bitmap.

BRIEF DESCRIPTION OF THE DRAWINGS

The teachings of the present invention can be readily understood by considering the following detailed description in conjunction with the accompanying drawings, in which.

To facilitate understanding, identical reference numerals have been used to designate elements having substantially the same or similar structure and/or substantially the same or similar function.

DETAILED DESCRIPTION OF THE INVENTION

Various embodiments provide a method and apparatus to provide TCAM usage efficiency by providing a common TCAM instantiation of service rules associated with multiple services and/or subscribers.

TCAM is an expensive resource in terms of cost, physical footprint, thermal requirements and so on. Various embodiments discussed herein are based in part upon the inventor's recognition that TCAM usage may be intelligently managed with different sets or types of users. For example, different types of users may sign up for different subset of available services; specifically, a first set of users may sign up for a subset of services including data and VoIP only, while a second set of users may sign up for a subset of services including data and video only. The TCAM processing associated with any member of a particular set of users may be the same or similar to other members of the particular set of users.

Figure 1:
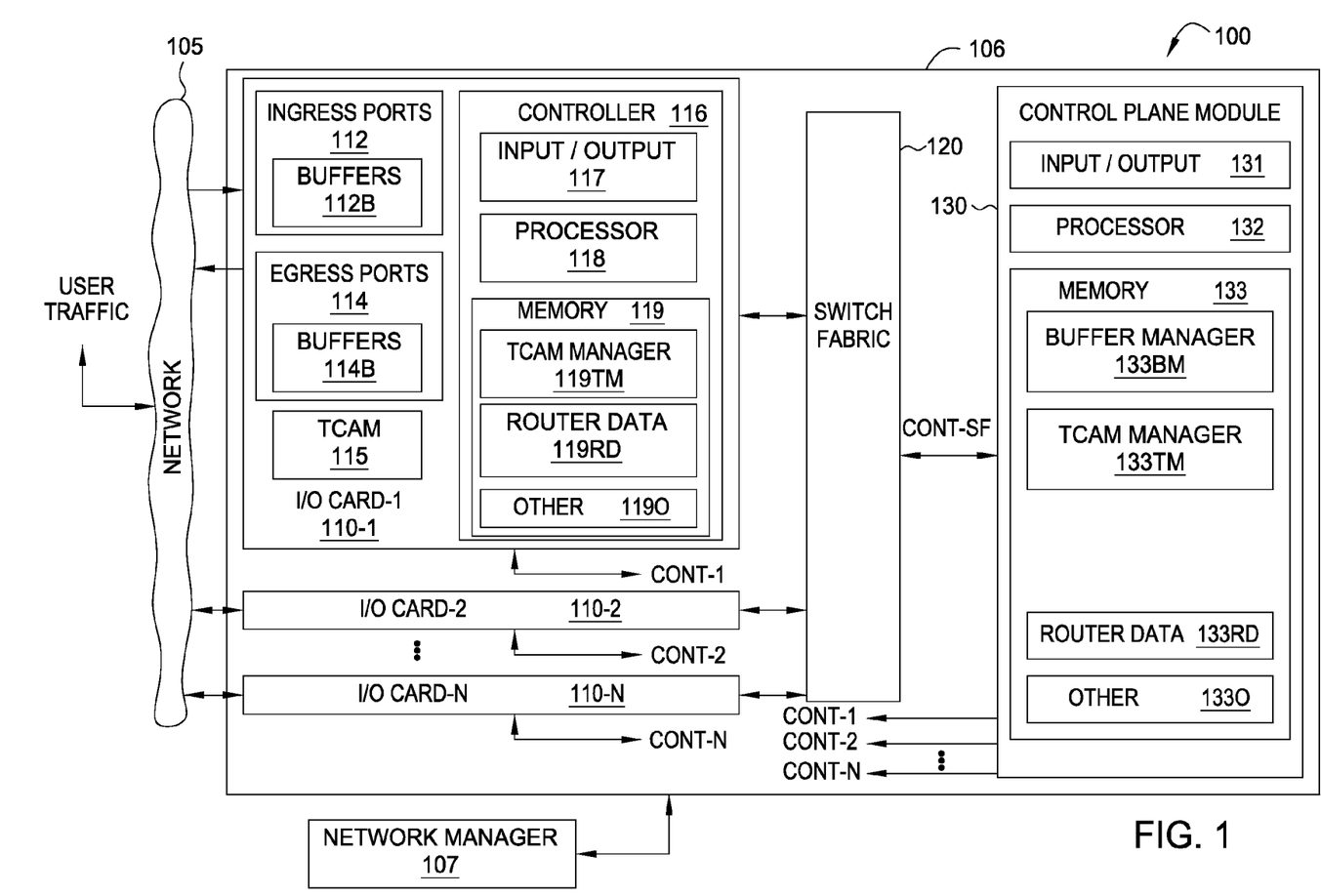
FIG. 1 depicts a high-level block diagram of an apparatus benefiting from embodiments of the present invention.

FIG. 1 depicts a high-level block diagram of an apparatus benefiting from embodiments of the present invention. Specifically, FIG. 1 depicts a router 106 in communication with a network 105 and a network manager 107.

The router 106 includes a plurality of input output (I/O) cards 110-1, 110-2 and so on up to 110-N (collectively I/O cards 110), a switch fabric 120 and a control plane module 130. The control plane module 130 controls the operation of the I/O cards 110 and switch fabric 120 by respective control signals CONT.

Each of the I/O cards 110 includes a plurality of ingress ports 112 including corresponding ingress port buffers 112B, a plurality of egress ports 114 including corresponding egress port buffers 114B, a TCAM module 115, and a controller 116.

The controller 116 includes an I/O module 117, a processor 118 and memory 119. The memory 119 is depicted as including software modules, instantiated objects and the like to provide a TCAM manager 119TM, routing data 119RD and other functions 119O. The controller 116 may be implemented as a general purpose computing device or specific purpose computing device, such as described below with respect to FIG. 6.

The I/O cards 110 operate to convey packets between the network 105 and the switch fabric 120. Packets received at a particular ingress port 112 of an I/O card 110 may be conveyed to the switch fabric 120 or back to the network 105 via a particular egress port 112 of the I/O cards 110. Routing of packets via the I/O cards 110 is accomplished according to routing data provided by the control plane module 130, which may be stored in the routing data portion of memory 119.

The switch fabric 120 may comprise any standard switch fabric such as electrical, optical, electro-optical, MEMS and the like.

The control plane module 130 receives from a network manager 107 configuration data, routing data, policy information, policer information and other information pertaining to various management functions. The control plane module 130 provides management and operations data to the network manager 107, including data such as configuration data, status data, alarm data, performance data and the like.

The control plane module 130 comprises an I/O module 131, a processor 132 and memory 133. The memory 133 is depicted as including software modules, instantiated objects and the like to provide a buffer manager 133BM, a TCAM manager 133TM, routing data 133RD and other functions 133O. The control plane module 130 may be implemented as a general purpose computing device or specific purpose computing device, such as described below with respect to FIG. 6.

It is noted that various functions described herein are depicted as being included within both of the controller 116 of the I/O card 110 and the control plane module 130. However, in various embodiments the functions so depicted are included within only one of the controller 116 of the I/O card 110 and the control plane module 130. That is, the TCAM manager function may, in various embodiments, be implemented as part of the controller 116 (i.e., as TCAM manager 119TM) or be implemented as part of the control plane module 130 (i.e., as TCAM manager 133TM). Similarly, the router data may, in various embodiments, the implemented as part of the controller 116 (i.e., as router data 119RD) or be implemented as part of the control plane module 130 (i.e., as router data 133RD).

The buffer manager 133BM operates to manage the configuration of the various buffers such that they conform to the buffer structure provided by, illustratively, ingress ports, egress ports, switch fabric and so on. The buffer manager 133 BM also interacts with the various buffers operative within the context of the router 106 to determine whether soft or hard limits have been reached, such as an overutilization warning limit (e.g., 80% of buffer utilization level), an overutilization alarm limit (e.g., 95% of buffer utilization level) and so on.

The router 106 is operable to process traffic to and from various client devices, networks and so on (not shown) operably communicating with network 105. In processing traffic received from client devices and the like, the router 106 performs various functions such as described below to ensure that the appropriate service parameters are associated with the process traffic.

The routing data 119RD or 133RD operates to process routing information such that packets or traffic flows received at ingress ports are routed to appropriate egress ports within the context of router 106. The routing data 133RD may include routing tables, protection or fault recovery information and so on.

The TCAM manager 119TM or 133TM operates to process service or policy information such as service level agreement (SLA), traffic classification constraints, subscriber/user constraints, differentiated service levels, differentiated QoS levels/parameters and, generally, any other parameter impacting the number, type, operating parameters and/or other characteristics associated with classification or processing rules used within the context of a received packet processing. Generally speaking, the TCAM manager 119TM or 133TM operates to enable efficient processing of user/client traffic with respect to the TCAM 115. Exemplary function sets associated with TCAM manager 133TM will be described in more detail below with respect to FIG. 2.

Generally speaking, TCAM manager 119TM or 133TM manages the use of TCAM 115 associating individual clients with one or more clients, where each client is associated with a subset of available services. In this manner, rather than instantiating within the TCAM a group of rules associated with each client, a group of rules is associated with each set of similarly situated clients. Various embodiments discussed herein address mechanisms for identifying client membership, instantiating appropriate set rules and so on.

Thus, various embodiments improve TCAM usage efficiency by providing a common TCAM instantiation of service rules associated with multiple services and/or subscribers. For example, one embodiment provides for the building of a set of services which are common among n users, where the number of elements in each such super set can be limited to 8, 16 or 32 (depending on the width of TCAM available). For illustrative purposes, the services set are limited to eight (8). Each user may be using a sub-set of services or all eight (8).

Figure 2:
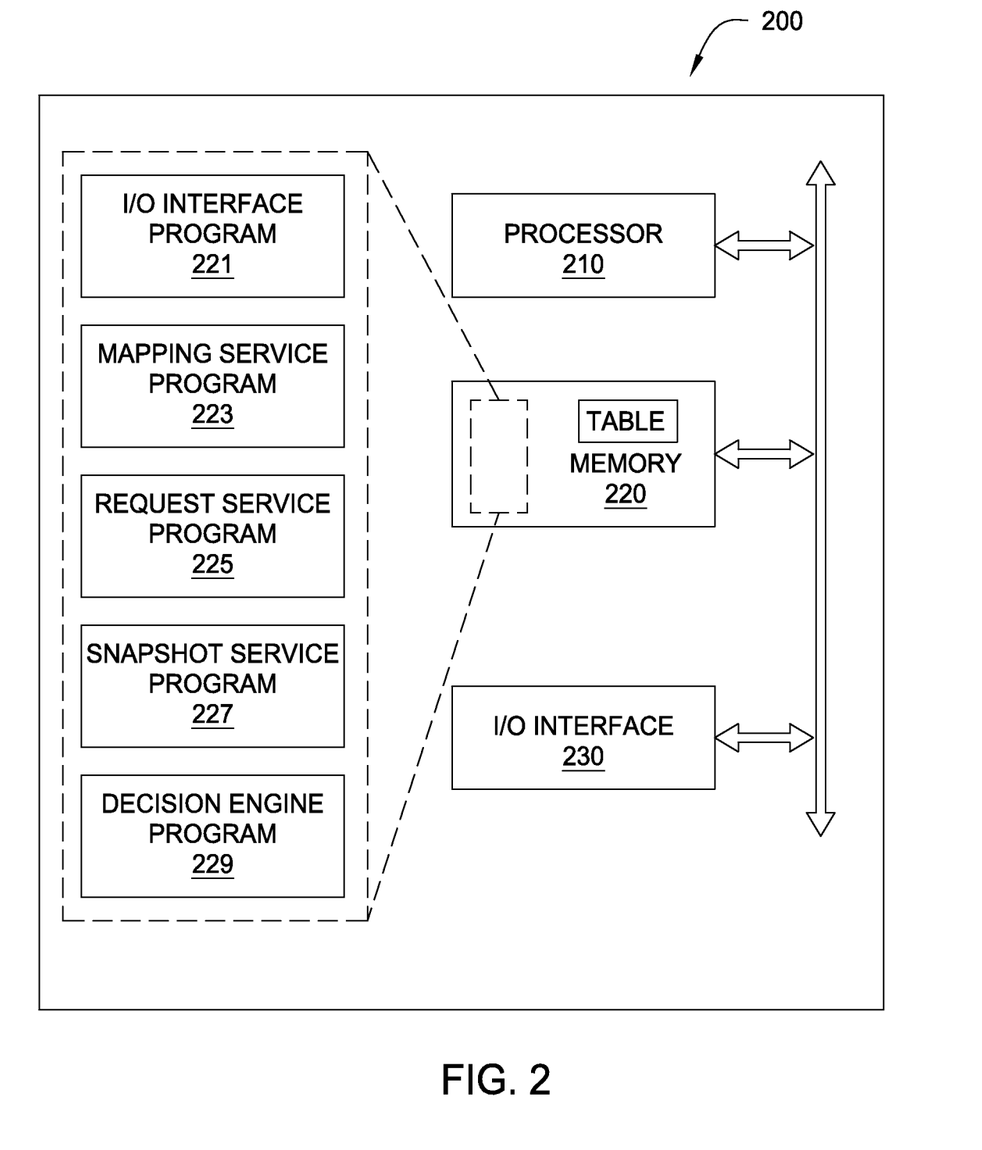
FIG. 2 depicts a high-level block diagram of a network element portion according to one embodiment.

FIG. 2 depicts a high-level block diagram of TCAM manager apparatus suitable for use in various embodiments. Specifically, TCAM manager apparatus 260 includes a processor 210, a memory 220, and an I/O interface 230 implementing a TCAM manager function suitable for implementing one or more of the relevant functions described above with respect to FIG. 1.

Processor 210 controls the operation of TCAM manager apparatus 260. Processor 210 cooperates with memory 220 and I/O interface 230.

Memory 220 may store various programs adapted for execution by processor 210, as well as a TCAM Key Composition Table such as described in more detail below with respect to the TCAM Key Composition Table 310 of FIG. 3.

The processor-executable programs may include an I/O interface program 221, a mapping service program 223, a request service program 225, a snapshot service program 227 and a decision engine program 229. Processor 210 cooperates with memory 220 to controllably execute the various programs.

I/O interface 230 cooperates with processor 210 and I/O interface program 221 to support communications with Network 105, Switch Fabric 120 and Control Plane Module 130.

Mapping service program 223 performs mapping of the different tables needed to create the TCAM lookup key. Mapping service program 223 also maintains the allocation mapping used by TCAM manager apparatus 260 to point to which copy of data to use for file I/O operations.

Request service program 225 receives and responds to user traffic from Network 105. Various embodiments provide for a set of services which are common among n users, where the number of elements in each such super set can be limited to 8, 16 or 32 (depending on the width of TCAM available).

Decision engine program 229 pushes updates periodically from I/O 117. Advantageously, decision service program 229 can potentially free space on storage system 119. Decision engine program 229 determines the optimal size of one or more of the I/O efficient storage system volumes based on the width of the TCAM.

In some embodiments, TCAM 260 may be a virtual machine. When processor-executable programs stored in memory 220 are implemented on processor 210, the program code segments combine with the processor to provide a unique device that operates analogously to specific logic circuits.

Figure 3A:
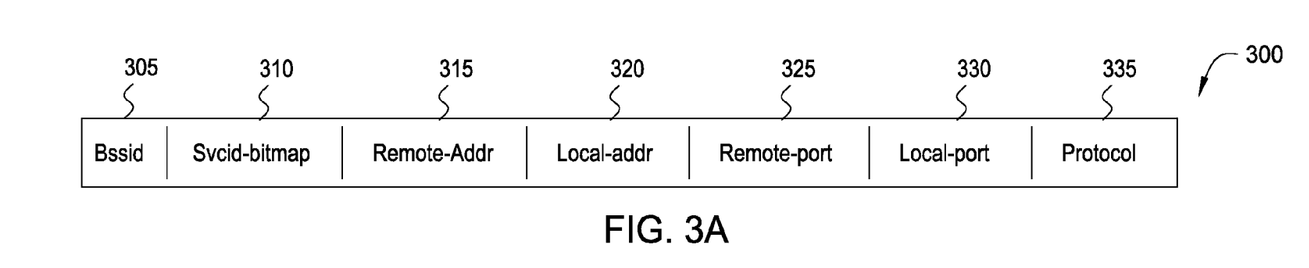
FIG. 3A depicts a graphical representation of the TCAM Key Composition Table 310 utilized by the mapping service program 223 of FIG. 2.

FIG. 3A depicts a graphical representation of the TCAM Key Composition Table 310 utilized by the mapping service program 223 of FIG. 2. For illustrative purposes, a service is defined as a collection of 5-tuple rules. For illustrative purposes, the service set is limited to eight (8). Each user may be using a sub-set of services or all eight (8). For example, if S represents a set of 5-tuple to identify a particular service, then a set of eight (8) such services can be represented as follows:

{S1, S2, S3, S4, S5, S6, S7, S8}.

Further, if BSS denotes Base Service Set, i.e., a set of services; then, Base Services Set={S1, S2, S3, S4, S5, S6, S7, S8}.

Each such super set or BSS would be identified by a numeric 16-bit ID called BSS-ID and each service within a BSS is identified by a bit ID i.e., a unique bit would be set for a service in a 16-bit word. For example, above Base Service Set represented by an ID of 1 and S1 would be assigned an ID of (0x01), S2 (0x02), S3 (0x04) and so on.

Referring to FIG. 3A, for field 305 BSSID is a 16-bit numeric identifier for a BSS. In some embodiments, BSSID is a 32-bit numeric identifier for a BSS. In other embodiments, this field has a variable length.

In various embodiments, field 310 is a numeric identifier for a BSS. Field 315 is IPv4/6 (i.e., 32/128 bits) Destination address. Field 320 is IPv4/6 (i.e. 32/128 bits) Source address. Field 325 is the TCP/UDP Destination Port number (16 bits). Field 330 is the TCP/UDP Source Port number (16 bits). Field 335 identifies the Protocol of the packet (8 bits).

In one embodiment, the mask for BSS-ID and Service ID is the same. In other embodiment, different masks are used for BSS-ID and for Service ID. Masks for other fields are configured according to policy.

A user database should include at least an ID of Base Services Set and bitmap of all subscribed services. In various embodiments, this information is used to form a TCAM lookup key. The TCAM lookup key would match only those services, which are present in a particular user's database because each TCAM entry contains a service's Bit ID. In other embodiments, the information is augmented to form the TCAM lookup key. An illustration of a packet lookup follows. The following set represents a common set of services among eight (8) different users.

BSS-ID$_1$={S1, S2, S3, S4, S5, S6, S7, S8}.

Figure 3B:
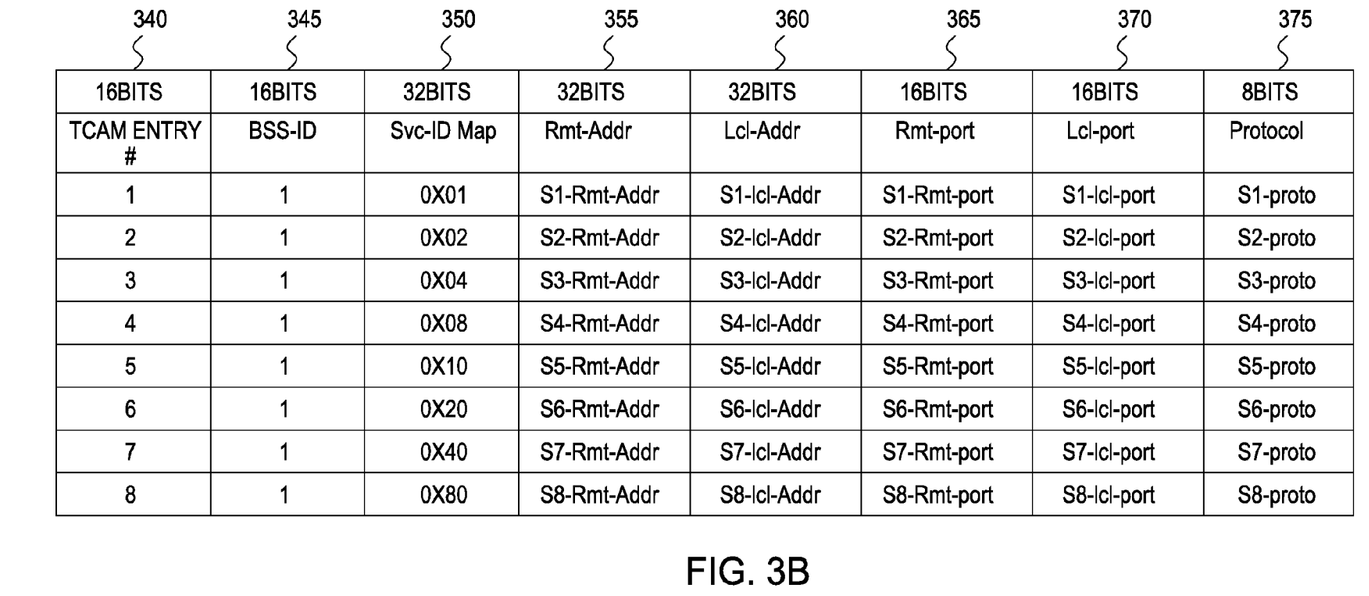
FIG. 3B depicts a TCAM classification field and Services Map Table illustrating an embodiment of a classification criteria used in TCAM key Composition Table of FIG. 3.

Referring to FIG. 3B, this Base Service Set (BSS-ID$_1$) is programmed in TCAM as shown. Field 340 represents the number of entries and is a 16-bit field. BSSID Field 345 is a 16-bit numeric identifier for a BSS. Field 350 is a 32-bit numeric identifier for a service. Field 355 "S$_n$-Rmt-Addr" is a 32-bit IPv4 Destination Address for Service$_n$. Field 360 "Lcl-Addr" is a 32-bit IPv4 Source Address for Service$_n$. Field 365 "Rmt-port" is a 16-bit TCP/UDP Destination Port Service$_n$. Field 370 "Lcl-port" is a 16-bit TCP/UDP Source Port for Service$_n$. Field 375 identifies the protocol for Service$_n$.

Figure 4A:
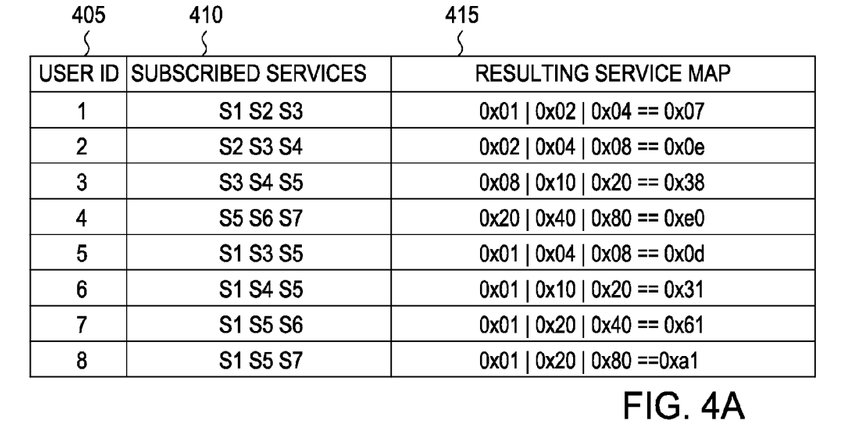
FIG. 4A depicts a graphical representation of a User's Services Map according to an embodiment.

FIG. 4A depicts a graphical representation of a user's services map according to one embodiment. Specifically, FIG. 4A depicts a table of sub-set of services subscribed to by each individual user. Field 405 represents the user ID. Field 410 lists the subscribed services. Field 415 represents the service map for each user.

Figure 4B:
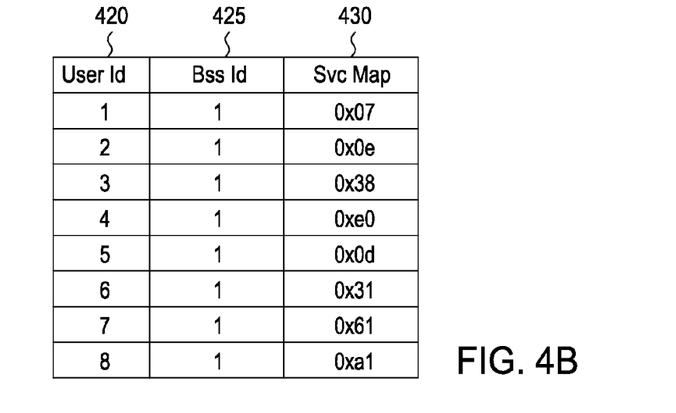
FIG. 4B depicts a graphical representation of a User's Data Base according to an embodiment.

In various embodiments, the user database is modified according to the above derived services bit map. FIG. 4B depicts a graphical representation of a user's data base according to an embodiment. Referring to FIG. 4B, the user data base comprises the three fields, i.e., 420, 425 and 430. In other embodiments, other fields are added to augment the user's data base. Fields 420, 425 and 430 are described above in reference to FIG. 4A.

Figure 4C:
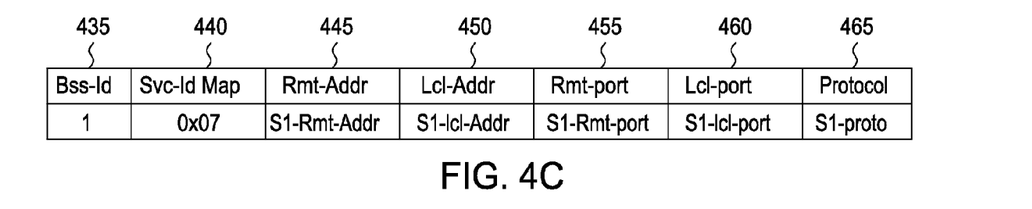
FIG. 4C depicts a graphical representation of a Lookup Key on User 1 Traffic for Service 1 according to an embodiment.

Illustratively, if a user identified by user ID 1 receives traffic for service 1, then using the user's database and received data packet, the TCAM lookup key is composed as shown in FIG. 4C, which depicts a graphical representation of a lookup key on user 1 traffic for service 1 according to an embodiment. Field 435 is the same as shown in FIG. 4B. Field 440, which is the Svc-ID map contains '0x07' and Svs-ID bit is 0x01 as shown in TCAM entry 1 of FIG. 3B. Fields 445-465 are as shown; therefore, the request matches entry 1 as expected.

In another embodiment, user 1 receives traffic for service 4, which user 1 did not subscribe to. As a result, the search request to determine whether or not user 1 subscribes to service 4 is constructed as shown in FIG. 4D.

Figure 4D:
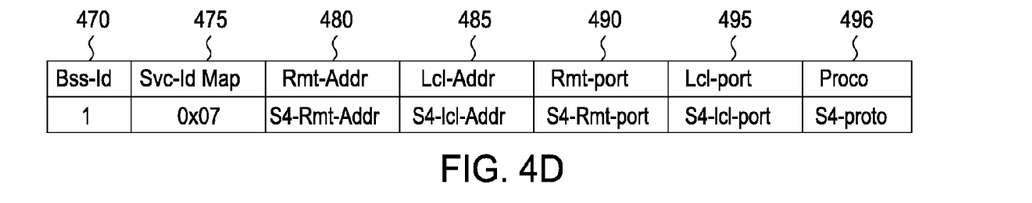
FIG. 4D depicts a graphical representation of a Lookup Key on User 1 Traffic for Service 4 according to an embodiment.

FIG. 4D depicts a graphical representation of a Lookup Key on User 1 Traffic for Service 4 according to an embodiment. Specifically, FIG. 4D depicts Service-ID bitmap to be 0x07, and Service-ID to be 0x08 as shown in TCAM entry 4 of FIG. 3B. Fields 480-496 are as shown; however, the request does not match entry 1 as expected because user 1 does not subscribe to service 4.

The various embodiments discussed above provide a mechanism to share TCAM entries among multiple users even when each user is required to enable a selective set of services.

Figure 5:
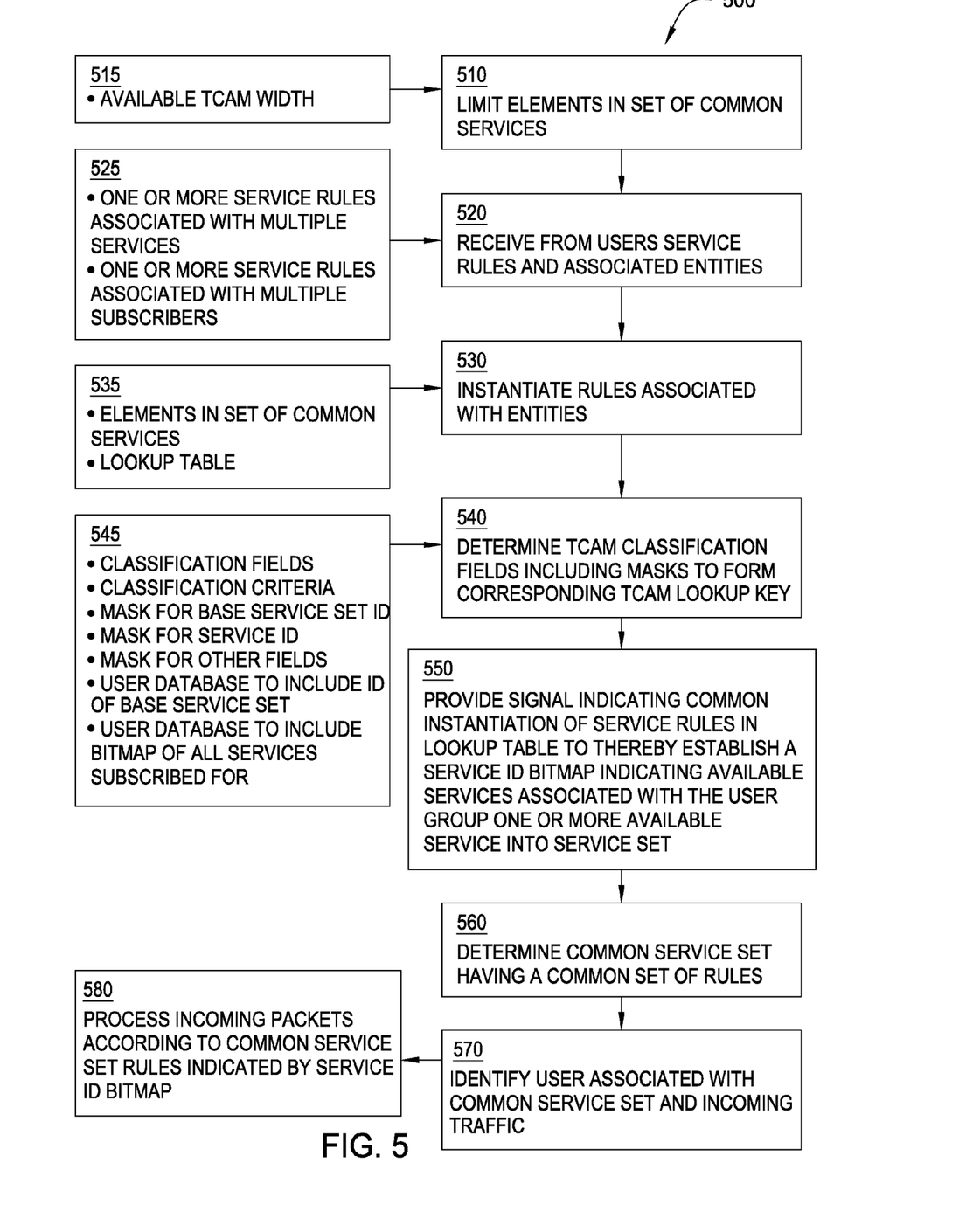
FIG. 5 depicts a flow diagram of a method according to an embodiment.

FIG. 5 depicts a flow diagram of a method according to one embodiment. Specifically, FIG. 5 depicts a method suitable for use at a TCAM or other entity operative to provide TCAM usage efficiency by providing a common TCAM instantiation of service rules associated with multiple services and/or subscribers.

At step 510, TCAM or other entity limits the elements in a set of common services as a result of available TCAM width. In other embodiments, TCAM width is dynamically adjusted. At step 520, service rules associated with different entities are received. In various embodiments, the service rules are associated with users or subscribers. In other embodiments, the service rules are associated with multiple services. In yet other embodiments, the service rules are associated with both subscribers and a multiple of services.

Referring to box 525, one or more service rules may be associated with multiple services. Generally speaking, one or more service rules may also be associated with multiple subscribers.

At step 530, the service rules are instantiated. Referring to box 535, elements in set of common services are instantiated and a lookup table is generated.

At step 540, a determination of the TCAM classification fields is made. The determination includes the masks forming the corresponding TCAM lookup key.

Referring to box 545, this determination is made using classification criteria, mask for base service set ID, mask for service ID, mask for other fields and the like. Generally, this step requires that the user database includes ID of base service set and bitmap of all services subscribed for.

At step 550, a signal is provided indicating common instantiation of service rules in the look-up table in response to a search request. A service ID bitmap is established based upon the service profile information of a user as described above. The available services are grouped into service set. At step 560, a common service set having a common set of rules is determined. The user associated with a request or incoming packet is identified based on phone ID, source address and the like. If a user is authenticated, the packet is processed; otherwise, the packet is dropped. At step 570, the user associated with a common service set is identified. At step 580, the incoming packets are processed according to common service set rules indicated by service ID bitmap. These criteria include service level agreement (SLA), traffic classification constraints, subscriber/user constraints, differentiated service levels, differentiated QoS levels/parameters and, generally, any other parameter impacting the number, type, operating parameters and/or other characteristics associated with classification or processing rules used within the context of a received packet processing.

The various steps described herein with respect to FIG. 5 implement an efficient usage of TCAM, illustratively, a common TCAM instantiation of service rules associated with multiple services and/or subscribers is provided.

The various embodiments discussed herein primarily contemplate the use of ternary content addressable memory (TCAM) adapted for having instantiated therein data representative of various rules, services and so on. In various embodiments, non-TCAM memory is also be used for this purpose, such as one or more of the memory elements discussed herein with respect to the various figures. In various embodiments, a combination of TCAM and non-TCAM memory is used for this purpose. In various embodiments, other types of content addressable memory may be used.

Figure 6:
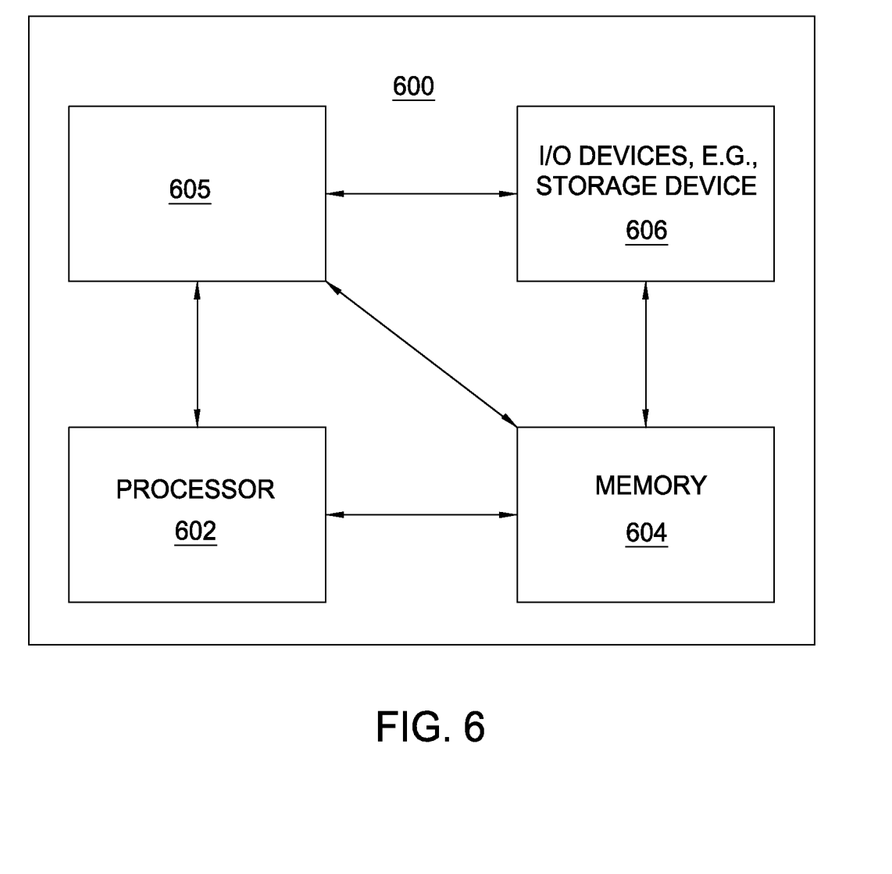
FIG. 6 depicts a high-level block diagram of a general-purpose computer suitable for use in performing the functions described herein.

FIG. 6 depicts a high-level block diagram of a general purpose computer suitable for use in performing the functions described herein. As depicted in FIG. 6, system 600 comprises a processor element 602 (e.g., a CPU), a memory 604, e.g., random access memory (RAM) and/or read only memory (ROM), a packet processing module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It will be appreciated that computer 600 depicted in FIG. 6 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware; for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method of processing incoming packets, the method comprising:

establishing for each of a plurality of users a respective service ID bitmap adapted to indicate one or more services associated with said each user wherein each service is associated with a corresponding set of rules instantiated into a memory, each rule being associated with a respective service ID, wherein the one or more services are common among some users, and a number of elements in the one or more services being common among said some users depends on a width of an available ternary content addressable memory (TCAM);

grouping a plurality of services into a common service set associated with a common set of rules;

determining each user associated with the common service set; and processing each received packet from the user associated with the common service set according to the associated common set of rules indicated by the respective service ID bitmap for said user.

2. The method of claim 1, wherein the service ID bitmap comprises one or more of: services and subscribers.

3. The method of claim 1, wherein each of the some users utilizes a subset of services.

4. The method of claim 3, wherein each of the some users utilizes all of the services.

5. The method of claim 1, wherein criteria for grouping the incoming packets include one or more of: a service level agreement (SLA), traffic classification constraints, subscriber/user constraints, differentiated service levels, and differentiated quality of service (QoS) levels/parameters.

6. The method of claim 1, wherein the plurality of services includes one or more of: data, video and VoIP.

7. An apparatus for processing incoming packets, the apparatus comprising:

a memory; and a processor configured to:

establish for each of a plurality of users a respective service ID bitmap adapted to indicate one or more services associated with said each user wherein each service is associated with a corresponding set of rules instantiated into a memory, each rule being associated with a respective service ID, wherein the one or more services are common among some users, and a number of elements in the one or more services being common among said some users depends on a width of an available ternary content addressable memory (TCAM);

group a plurality of services into a common service set associated with a common set of rules;

determine each user associated with the common service set; and process each received packet from the user associated with the common service set according to the associated common set of rules indicated by the respective service ID bitmap for said user.

8. The apparatus of claim 7, wherein the service ID bitmap comprises one or more services and subscribers.

9. The apparatus of claim 7, wherein each of one or more users utilizes a subset of services.

10. The apparatus of claim 9, wherein each of the one or more users utilizes all of the services.

11. The apparatus of claim 7, wherein criteria for grouping the incoming packets include one or more of a service level agreement (SLA), traffic classification constraints, subscriber/user constraints, differentiated service levels, and differentiated quality of service (QoS) levels/parameters.

12. The apparatus of claim 7, wherein the plurality of services includes one or more of data, video and VoIP.

13. A non-transitory computer readable medium including software instructions which, when executed by a processor, perform a method for processing incoming packets comprising:

establishing for each of a plurality of users a respective service ID bitmap adapted to indicate one or more services associated with said each user wherein each service is associated with a corresponding set of rules instantiated into a memory, each rule being associated with a respective service ID, wherein the one or more services are common among some users, and a number of elements in the one or more services being common among said some users depends on a width of an available ternary content addressable memory (TCAM);

grouping a plurality of services into a common service set associated with a common set of rules;

determining each user associated with the common service set; and processing each received packet from the user associated with the common service set according to the associated common set of rules indicated by the respective service ID bitmap for said user.

14. A computer program product comprising non-transitory computer readable medium embodied with computer instructions to be executed by a processor, to implement a method for processing incoming packets, the method comprising:

establishing for each of a plurality of users a respective service ID bitmap adapted to indicate one or more services associated with said each user wherein each service is associated with a corresponding set of rules instantiated into a memory, each rule being associated with a respective service ID, wherein the one or more services are common among some users, and a number of elements in the one or more services being common among said some users depends on a width of an available ternary content addressable memory (TCAM);

grouping a plurality of services into a common service set associated with a common set of rules;

determining each user associated with the common service set; and processing each received packet from the user associated with the common service set according to the associated common set of rules indicated by the respective service ID bitmap for said user.

* * * * *